United States Patent
Tanikawa et al.

(10) Patent No.: US 7,175,157 B2
(45) Date of Patent: Feb. 13, 2007

(54) FLUID CONTROLLER

(75) Inventors: Tsuyoshi Tanikawa, Osaka (JP); Shigeru Itoi, Osaka (JP); Tadayuki Yakushijin, Osaka (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 10/553,623

(22) PCT Filed: Dec. 7, 2004

(86) PCT No.: PCT/JP2004/018537

§ 371 (c)(1),
(2), (4) Date: Oct. 19, 2005

(87) PCT Pub. No.: WO2005/054729

PCT Pub. Date: Jun. 16, 2005

(65) Prior Publication Data

US 2006/0214130 A1    Sep. 28, 2006

(30) Foreign Application Priority Data

Dec. 8, 2003    (JP) ............................. 2003-408975

(51) Int. Cl.
  *F16K 1/00*    (2006.01)
(52) U.S. Cl. ..................................... 251/331
(58) Field of Classification Search ................. 251/331
  See application file for complete search history.

(56) References Cited

U.S. PATENT DOCUMENTS 4,276,899 A * 7/1981 Kirk-Duncan ............. 137/327
4,793,588 A * 12/1988 Laverty, Jr. ............... 251/30.03
5,964,446 A * 10/1999 Walton et al. ............... 251/127

(Continued)

FOREIGN PATENT DOCUMENTS

| JP | 9-100930 | 4/1997 |
|----|----------|--------|
| JP | 10-332003 | 12/1998 |
| JP | 2977766 | 11/1999 |

(Continued)

*Primary Examiner*—J. Casimer Jacyna
(74) *Attorney, Agent, or Firm*—Armstrong, Kratz, Quintos, Hanson & Brooks, LLP

(57) ABSTRACT

A fluid controller, wherein the recessed port (25) of a body (22) is formed of larger diameter part (25a) near an opening and a small diameter part (25c) continued to the lower part of the large diameter part (25a) through a step part (25b). A flow passage forming disk (26) is fitted to the recessed portion (25). The fluid passage forming disk (26) comprises a large diameter cylindrical part (31) fitted to the large diameter part (25a) in the recessed portion, a connection part (32) supported by the step part (25b) in the recessed portion, and a small diameter cylindrical part (33) having an outer diameter smaller than the inner diameter of the small diameter part (25c) in the recessed portion and having a lower end supported by the bottom surface of the recessed portion (25). A plurality of through-holes (34) communicating an annular space (S1) on the outside of the small diameter cylindrical part with an annular space (S2) on the inside of the large diameter cylindrical part are formed at the connection part (32) of the flow passage forming disk. The fluid inflow passage (23) is led into the lower end of the small diameter cylindrical part (33) of the flow passage forming disk (26), and a fluid outflow passage (24) is led into the annular space (S1) on the outside of the small diameter cylindrical part.

6 Claims, 3 Drawing Sheets

U.S. PATENT DOCUMENTS

| | | |
|---|---|---|
| 6,254,057 B1 | 7/2001 | Pubben et al. |
| 6,786,471 B2 * | 9/2004 | Nakata et al. ............... 251/331 |
| 6,997,440 B2 * | 2/2006 | Tutt et al. .................... 251/331 |
| 2003/0025099 A1 * | 2/2003 | Nakata et al. ............... 251/331 |
| 2003/0042459 A1 * | 3/2003 | Gregoire ..................... 251/331 |

FOREIGN PATENT DOCUMENTS

| | | |
|---|---|---|
| JP | 2000-65225 | 3/2000 |
| JP | 2000-213667 | 8/2000 |
| JP | 2003-42314 | 2/2003 |

* cited by examiner

FLUID CONTROLLER

TECHNICAL FIELD

The present invention relates to a fluid controller, in particular, a fluid controller suitable for treating a large flow rate of fluid.

BACKGROUND ART

A fluid controller to which the present invention is directed is called as a diaphragm valve and is used frequently (for example, refer to Patent Document 1=Japanese Unexamined Patent Publication No. 2003-42314). A typical structure thereof is shown in FIG. 4.

A fluid controller 1 comprises a block-like main body 2 having a fluid inflow passage 2a, a fluid outflow passage 2b and a concave portion 2c open upward, an annular valve seat 3 arranged in a peripheral edge of the fluid inflow passage 2a, a diaphragm 4 pressed against or moved apart from the annular valve seat 3 so as to open and close the fluid passage 2a, a valve body presser foot 5 pressing the diaphragm 4 and capable of moving in a vertical direction, a cylindrical hood 6 having a lower end portion inserted to the concave portion 2c of the main body 2 and extending upward, a tubular male thread member 7 screwed into a female thread portion formed in an inner periphery of the concave portion 2c of the main body 2 so as to fix the hood 6 to the main body 2, a cover 8 covering the hood 6 existing above the tubular male thread member 7, a valve rod 9 inserted into the hood 6 in a vertically movable manner, having a lower end portion brought into contact with the valve body presser foot 5 and having an upper end portion protruding upward from the cover 8, an opening/closing handle 10 fixed to the upper end portion of the valve rod 9 so as to be rotated, thereby moving the valve rod 9 in a vertical direction, and a compression coil spring 11 received between the lower end portion of the valve rod 9 and the upper end portion of the hood 6 and biasing the valve rod 9 downward.

The fluid inflow passage 2a of the main body 2 has one end which is open toward a left side and the other end which is open to a center portion of a bottom surface of the concave portion 2c. The fluid outflow passage 2b has one end which is open toward a right side and the other end which is open to a right portion of the bottom surface of the concave portion 2c.

The cover 8 is formed into a cylindrical shape having a top wall 8a, and a through hole inserting an upper end portion of the valve rod 9 therethrough is provided in the top wall 8a. The handle 10 is formed into an approximately oval shape as seen from a plane, and is formed in a shape having a neck portion 10a in a center portion in a longitudinal direction. A countersunk head screw 12 passing through a peripheral wall of the cover 8 is screwed into a female thread provided in the hood 6, so that the cover 8 is fixed to the hood 6.

The valve rod 9 has a flange 9a in a lower end portion, and a lower end portion of the hood 6 is provided with an inner peripheral surface guiding the flange 9a in a vertically movable manner and a step portion inhibiting the flange 9a from moving above a predetermined position. A spring receiving ring 17 is attached to a portion above the flange 9a of the valve rod 9 via a bearing 16. The compression coil spring 11 is received by the spring receiving ring 17 and an annular step portion provided in an upper portion of the hood 6.

A gap is provided between the top wall of the cover 8 and the top surface of the hood 6, a horizontal shaft 13 is passed through the portion of the valve rod 9 positioned in this gap, and a bearing 14 is attached to each of both end portions. A guide surface 15 guiding the bearings 14 and formed into an annular shape as seen from a plane and into a smooth concavo-convex shape in a height direction is formed in an upper end of the hood 6. A pair of convex portions 15a existing at positions 180° apart from each other in the guide surface 15 support the bearing 14.

The valve rod 9 is always biased downward by a compression coil spring 11, and the bearing 14 is pressed against the guide surface 15 on the basis of a biasing force. The guide surface 15 gradually becomes lower in height in accordance with a movement in a circumferential direction from the convex portion 15a, and has a concave portion 15b having a lowest height at a position moved at 90° from the convex portion 15a in the circumferential direction. The figure shows a fluid path closed state. A pair of concave portions 15b in the guide surface 15 support the bearing 14. Accordingly, the valve rod 9 is positioned at a lower side, that is, a fluid passage closing position. Further, when the valve rod 9 becomes in a 90° rotated state from the state in the figure, the bearing 14 moves on the guide surface 15 in a state of being pressed against the guide surface 15 on the basis of the biasing force of the compression coil spring 11, and after being rotated at 90°, the pair of convex portions 15a in the guide surface 15 support the bearing 14. As a result, the valve rod 9 is positioned at an upper side, that is, a fluid passage opening position. Accordingly, the structure is made such that the handle 10 is rotated at 90°, so that a closed state and an open state can be switched.

In the conventional fluid controller 1 shown as one example in FIG. 4, an opening in a concave portion side of the fluid inflow passage 2a is faced to an inner side of the annular valve seat 3, and an opening in a concave portion side of the fluid outflow passage 2b is faced to an outer side of the annular valve seat 3, a maximum value (about one third of a diaphragm diameter) of each of the diameters of the openings are limited by the diaphragm diameter (a diameter of the concave portion). In order to increase a flow rate coefficient or a Cv value, it is necessary to increase the diameter of the opening in the concave portion side of each of the passages 2a and 2b, that is, the diameter of the diaphragm 4. Accordingly, it is necessary to make a size of the fluid controller 1 large. However, in the existing device, there are many cases that the fluid controller can not be increased in size due to a problem of an installation space, and it is hard to make the flow rate large.

An object of the present invention is to provide a fluid controller which can circulate a large flow rate of fluid without enlarging its size.

DISCLOSURE OF THE INVENTION

In accordance with the present invention, there is provided a fluid controller comprising: a block-like main body having a fluid inflow passage, a fluid outflow passage and a concave portion open upward; and a diaphragm pressed against or moved apart from an annular valve seat arranged within the concave portion of the main body so as to open and close the fluid passages, wherein the concave portion is formed into a shape including a large-diameter portion close to the opening and a small-diameter portion connected to a lower side of the large-diameter portion via a step portion, and the fluid controller is further provided with a flow path forming disk fitted to the concave portion, the flow path forming disk includes a large-diameter cylinder portion fitted to the large-diameter portion of the concave portion in a fluid tight manner, a small-diameter cylinder portion having an outer diameter smaller than an inner diameter of the small-diameter portion of the concave portion and having a lower end received by a bottom surface of the concave portion, and a coupling portion coupling a lower end portion of the large-diameter cylinder portion and an upper end portion of the small-diameter cylinder portion and received by the step portion of the concave portion, and a peripheral edge portion of the diaphragm is fixed to an upper end portion of the large-diameter cylinder portion of the flow path forming disk, a valve seat is provided in the upper end portion of the small-diameter cylinder portion of the flow path forming disk, an inner annular space of the large-diameter cylinder portion is formed by an inner periphery of the large-diameter cylinder portion of the flow path forming disk, the diaphragm, the valve seat and a top surface of the coupling portion of the flow path forming disk, a plurality of through holes communicating an outer annular space of the small-diameter cylinder portion formed between the small-diameter cylinder portion of the flow path forming disk and a peripheral surface of the small-diameter portion of the concave portion with an inner annular space of the large-diameter cylinder portion are formed in a coupling portion of the flow path forming disk, any one of the fluid inflow passage and the fluid outflow passage is communicated with a lower end of the small-diameter cylinder portion of the flow path forming disk, and the other is formed so as to be communicated with the outer annular space of the small-diameter cylinder portion.

A passage including an inner side of the small-diameter cylinder portion, a portion between the valve seat and the diaphragm, the inner annular space of the large-diameter cylinder portion, the through holes of the coupling portion and the outer annular space of the small-diameter cylinder portion is formed between the fluid inflow passage and the fluid outflow passage by the flow path forming disk. Among them, since a cross sectional area of the small-diameter cylinder portion can be made larger than the passage opening of the conventional structure in which the openings of both of the fluid inflow passage and the fluid outflow passage are faced to the bottom surface of the concave portion, and the through holes of the coupling portion are formed in the annular portion in the outer side of the small-diameter cylinder portion, it is easy to set a total sectional area to a comparable level with a cross sectional area of the small-diameter cylinder portion, and it is possible to make the cross sectional area of the passage larger in comparison with the conventional structure.

In the fluid controller in accordance with the present invention, an operation drive portion pressing the diaphragm against the valve seat or moving the diaphragm apart from the valve seat may be structured such as to manually move a valve rod in a vertical direction, or move the valve rod in the vertical direction by compressed air, solenoid or the like. Further, the fluid controller may be of a normally open type or a normally close type.

There is a case that the passage communicating with the lower end of the small-diameter cylinder portion of the flow path forming disk includes a short passage extending directly below from the lower end of the small-diameter cylinder portion, and a long passage extending to an outer side from a lower end of the short passage so as to form an acute angle, and the passage communicating with the outer annular space of the small-diameter cylinder portion extends obliquely to a lower outer side from the outer annular space of the small-diameter cylinder portion.

Further, there is a case that a joint portion having an inclined passage communicating with the long passage is provided in one side surface of the main body in a protruding manner, and a joint portion having an inclined passage communicating with the passage communicating with the outer annular space of the small-diameter cylinder portion is provided in the other side surface of the main body in a protruding manner.

It is preferable that a total cross sectional area of a plurality of through holes in the vertical direction formed in the coupling portion of the flow path forming disk is set to 0.5 to 2.0 times of the cross sectional area of the small-diameter cylinder portion of the flow path forming disk. In accordance with the structure mentioned above, it is possible to easily obtain the fluid controller which is small and has a large flow rate.

It is preferable that a seal member is interposed between the lower end surface of the flow path forming disk and the bottom surface of the concave portion of the main body. In this case, it is more preferable that an annular seal projection brought into close contact with each of upper and lower surfaces of the seal member is formed in the lower end surface of the flow path forming disk and the bottom surface of the concave portion of the main body.

The seal member is constituted by a metal gasket, a Vickers hardness thereof is preferably 80 to 200 Hv, more preferably 100 to 140 Hv. A Vickers hardness of the lower end surface of the flow path forming disk and the bottom surface of the concave portion of the main body is preferably 250 to 450 Hv, more preferably 300 to 400 Hv. Further, it is preferable that the seal projection is mirror finished, and it is preferable that a Teflon coating is applied to the gasket.

In accordance with the fluid controller of the present invention, since it is possible to make the cross sectional area of the passage larger in comparison with the conventional structure, it is possible to increase a flow rate coefficient while keeping a size of the fluid controller fixed, or it is possible to achieve a downsizing of the fluid controller while keeping the flow rate coefficient.

BEST MODE FOR CARRYING OUT THE INVENTION

Figure 1:
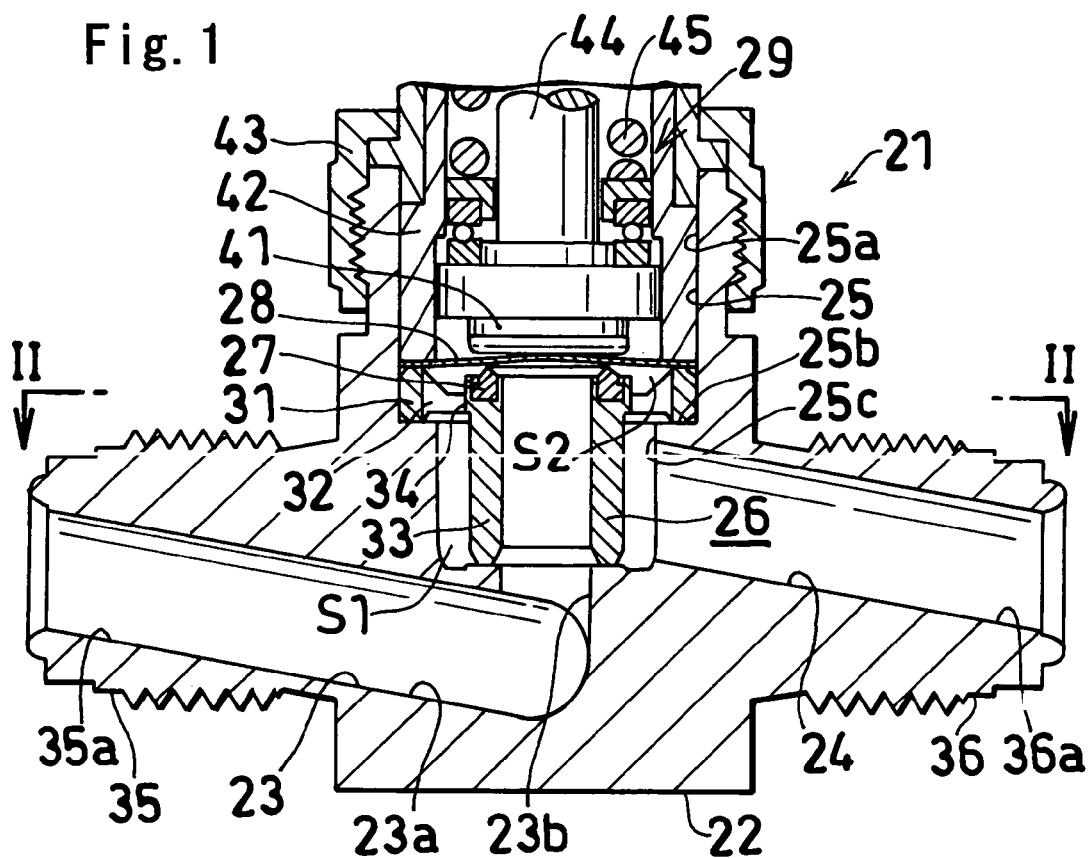
FIG. 1 is a vertical sectional view showing a first embodiment of a fluid controller in accordance with the present invention.

Description will be given below of embodiments in accordance with the present invention with reference to the accompanying drawings. In the following description, right and left mean right and left in the drawings.

Figure 2:
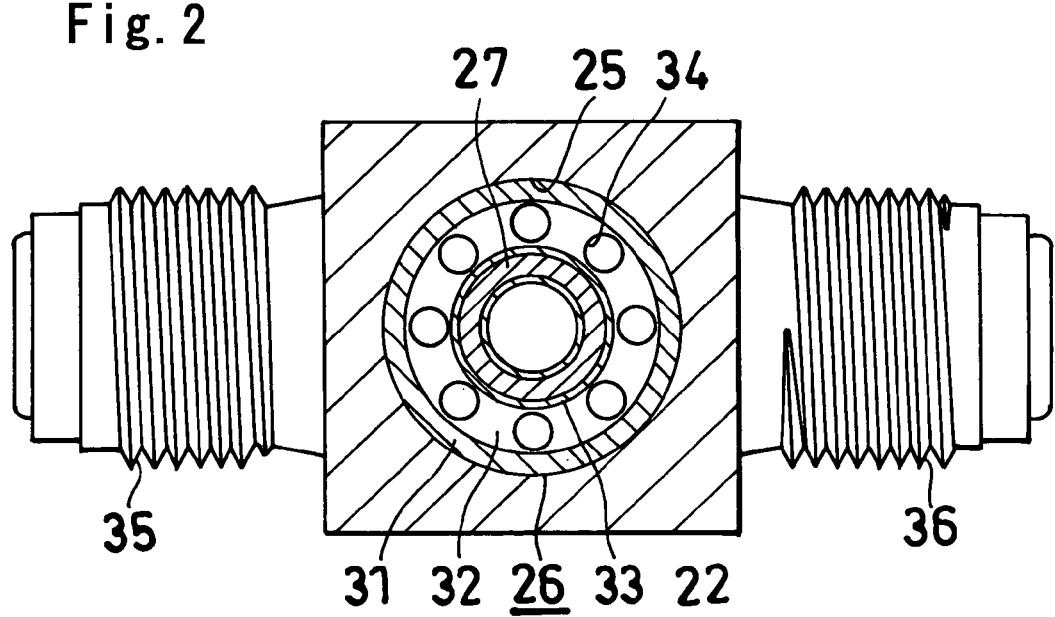
FIG. 2 is a plan view of the same.

FIGS. 1 and 2 show one embodiment of a fluid controller in accordance with the present invention.

A fluid controller 21 comprises a block-like main body 22 having a fluid inflow passage 23, a fluid outflow passage 23 and a concave portion 25 open upward, a flow path forming disk 26 fitted to the concave portion 25 of the main body 22, an annular valve seat 27 arranged in the flow path forming disk 26, a diaphragm 28 pressed against or moved apart from the valve seat 27 so as to open and close the fluid passage 23, and an operation driving portion pressing the diaphragm 28 against the valve seat 27 or moving the diaphragm 28 apart from the valve seat 27.

The concave portion 25 includes a large-diameter portion 25a close to the opening and a small-diameter portion 25c connected to a lower side of the large-diameter portion 25a via a step portion 25b.

The operation driving portion 29 is provided with a diaphragm presser foot 41 pressing a center portion of the diaphragm 28 and capable of moving in a vertical direction, a cylindrical hood 42 having a lower end portion inserted to the concave portion 22c of the main body 22 in such a manner as to press a peripheral edge portion of the diaphragm 28 to a lower side and extending upward, a hood nut 43 screwed into a male thread portion formed in an outer periphery of the concave portion 22c of the main body 22 so as to fix the hood 42 to the main body 22, a valve rod 44 inserted into the hood 42 in a vertically movable manner and having a lower end brought into contact with the valve body presser foot 5, and a compression coil spring 45 biasing the valve rod 44 downward.

The flow path forming disk 26 includes a large-diameter cylinder portion 31 fitted to the large-diameter portion 25a of the concave portion in a fluid tight manner, a small-diameter cylinder portion 33 having an outer diameter smaller than an inner diameter of the small-diameter portion 25c of the concave portion and having a lower end received by a bottom surface of the concave portion 25, and a coupling portion 32 coupling a lower end portion of an inner side surface of the large-diameter cylinder portion 31 and an upper end portion of an outer side surface of the small-diameter cylinder portion 33 and received by the step portion 25b of the concave portion. Accordingly, a small-diameter cylinder portion outer annular space S1 is formed between the small-diameter cylinder portion 33 of the flow path forming disk 26 and a peripheral surface of the small-diameter portion 25c of the concave portion.

The valve seat 27 is provided in an upper end surface of the small-diameter cylinder portion 33 of the flow path forming disk 26, and a leading end (an upper end) thereof is set to have an approximately the same height as that of an upper end of the large-diameter cylinder portion 31 of the flow path forming disk 26. The diaphragm 28 is fixed to an upper end portion of the large-diameter cylinder portion 31 of the flow path forming disk 26 in an outer peripheral edge portion thereof, and is structured such as to be brought into contact with a leading end of the valve seat 27 in an annular portion in an inner side in a radial direction from an outer peripheral edge portion in the case of being pressed downward by the diaphragm presser foot 41. Accordingly, there is formed a large-diameter cylinder portion inner annular space S2 surrounded by the inner periphery of the large-diameter cylinder portion 31 of the flow path forming disk 26, the diaphragm 28, the valve seat 27 and the upper surface of the coupling portion 32 of the flow path forming disk 26.

A plurality of through holes 34 in a vertical direction communicating the small-diameter cylinder portion outer annular space S1 and the large-diameter cylinder portion inner annular space S2 are formed in the coupling portion 32 of the flow path forming disk 26 at a uniform interval in a circumferential direction, as shown in FIG. 2.

The fluid inflow path 23 includes a short passage 23b extending directly below from the lower end opening of the small-diameter cylinder portion 33 of the flow path forming disk 26, and a long passage 23a extending to a left side (an outer side) so as to form an acute angle from a lower end of the short passage 23b, so that the opening close to the concave portion in the fluid inflow passage 23 is communicated with the lower end of the small-diameter cylinder portion 33 of the flow path forming disk 26. An inlet side joint portion 35 is provided in a left side surface of the main body 22 in a protruding manner, and a slope-shaped joint member inner passage 35a connected to the long passage 23a of the fluid inflow passage 23 in an extending manner is formed in the joint portion 35.

The fluid outflow passage 24b extends to a right lower side (an obliquely lower outer side) from a right surface of the small-diameter cylinder portion outer annular space S1. The outlet side joint portion 36 is provided in a right side surface of the main body 22 in a protruding manner, and a slope-shaped joint member inner passage 36a connected to the fluid outflow passage 24 in an extending manner is formed in the joint portion 36.

A male thread portion is provided in outer peripheries of the joint portions 35 and 36 in the inlet side and the outlet side. Shapes of the joint portions 35 and 36 are not limited to them, but can employ various types.

In accordance with the fluid controller 21, in the flow path open state in which the diaphragm presser foot 41 is moved upward, the fluid flows through the joint portion inner passage 35a, the fluid inflow passage 23, the small-diameter cylinder portion 33 of the flow path forming disk 26, the portion between the valve seat 27 and the diaphragm 28, the large-diameter cylinder portion inner annular space S2, the through hole 34 in the joint portion 32 of the flow path forming disk 26, the small-diameter cylinder portion outer annular space S1, and the joint portion inner passage 36a of the fluid outflow passage 24, in sequence. At this time, a size of the opening in the side of each of the concave portions of the fluid inflow passage 23 and the fluid outflow passage 24 and a cross sectional area of the communication path between the openings come to a neck portion for a large flow rate. However, the opening area in the side of the concave portion of the fluid inflow passage 23 can be enlarged at a degree that the fluid outflow passage 24 is not open to the bottom surface of the concave portion 25, and a necessary size of the opening area in the side of the concave portion of the fluid outflow passage 24 can be secured in a right surface of the small-diameter cylinder portion outer annular space S1. Further, a cross sectional area of the communication path between the openings in the side of the concave portions of the fluid inflow passage 23 and the fluid outflow passage 24 is secured in a total cross sectional area thereof by a plurality of through holes 34 being formed in the annular coupling portion 32, and both of the small-diameter cylinder portion outer annular space S1 and the large-diameter cylinder portion inner annular space S2 are formed in the annular shape, so that the cross sectional area thereof is secured. Thus, the cross sectional area of the communication path can be secured larger in comparison with the conventional structure. Accordingly, it is possible to circulate a large flow rate of fluid in the fluid controller 21. Therefore, it is possible to increase the area of the flow path without increasing the diameter of the diaphragm 28. Accordingly, it is possible to increase a flow rate coefficient while keeping the size of the fluid controller 21, or it is possible to achieve a downsizing of the fluid controller 21 while keeping the flow rate coefficient.

Figure 4:
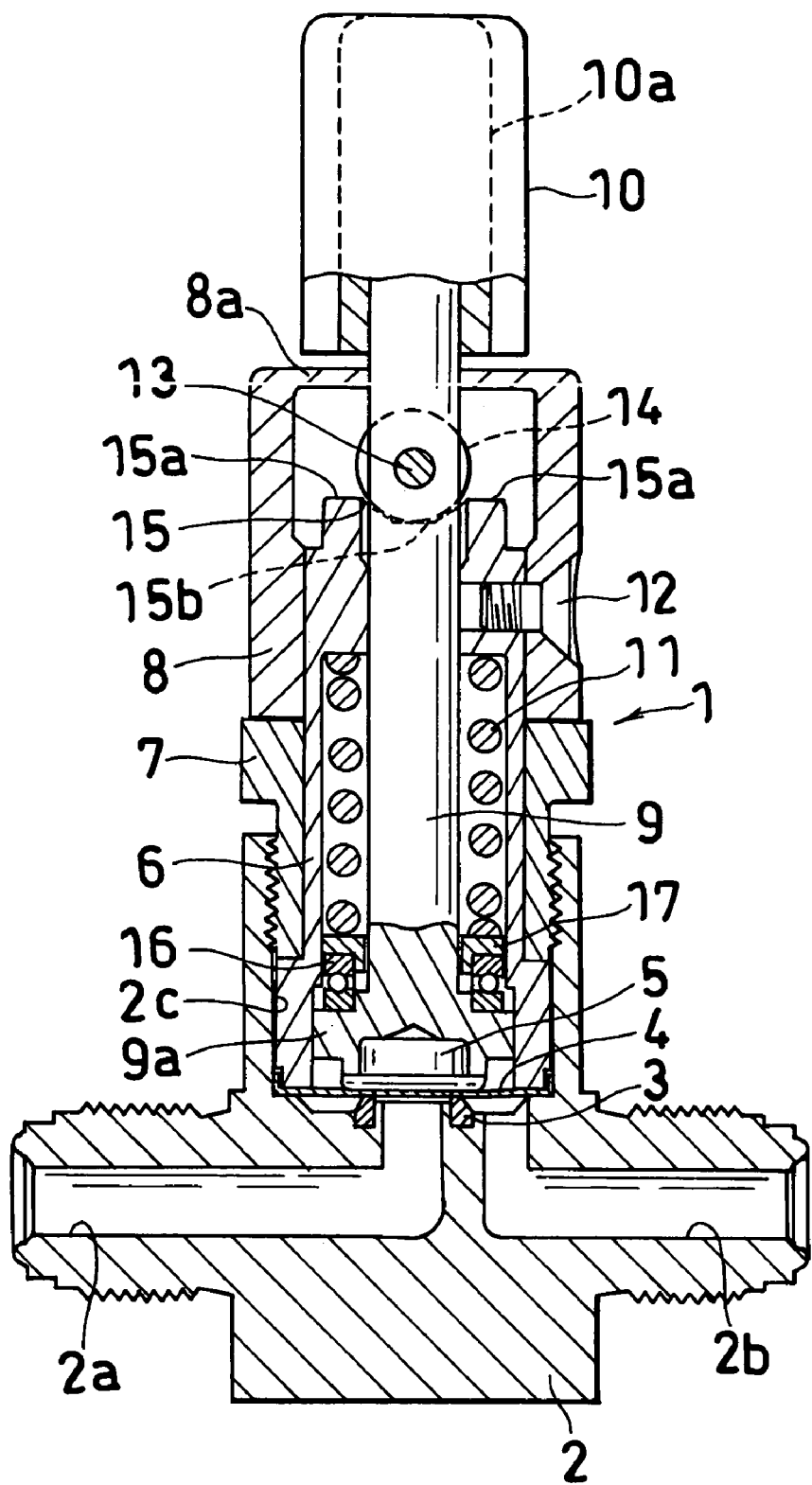
FIG. 4 is a vertical sectional view showing a conventional fluid controller targeted by the fluid controller in accordance with the present invention.

In this case, in the fluid controller 21 shown in FIGS. 1 and 2, as the operating driving portion 29 pressing the diaphragm 28 against the valve seat 27 or moving the diaphragm 28 apart from the valve seat 27, for example, the structure may be, of course, made such as to manually move the valve rod in a vertical direction as shown in FIG. 4. However, the structure may be made such as to move in the vertical direction on the basis of compressed air or solenoid. Further, the fluid controller 21 may be of a normally open type or a normally close type.

Figure 3:
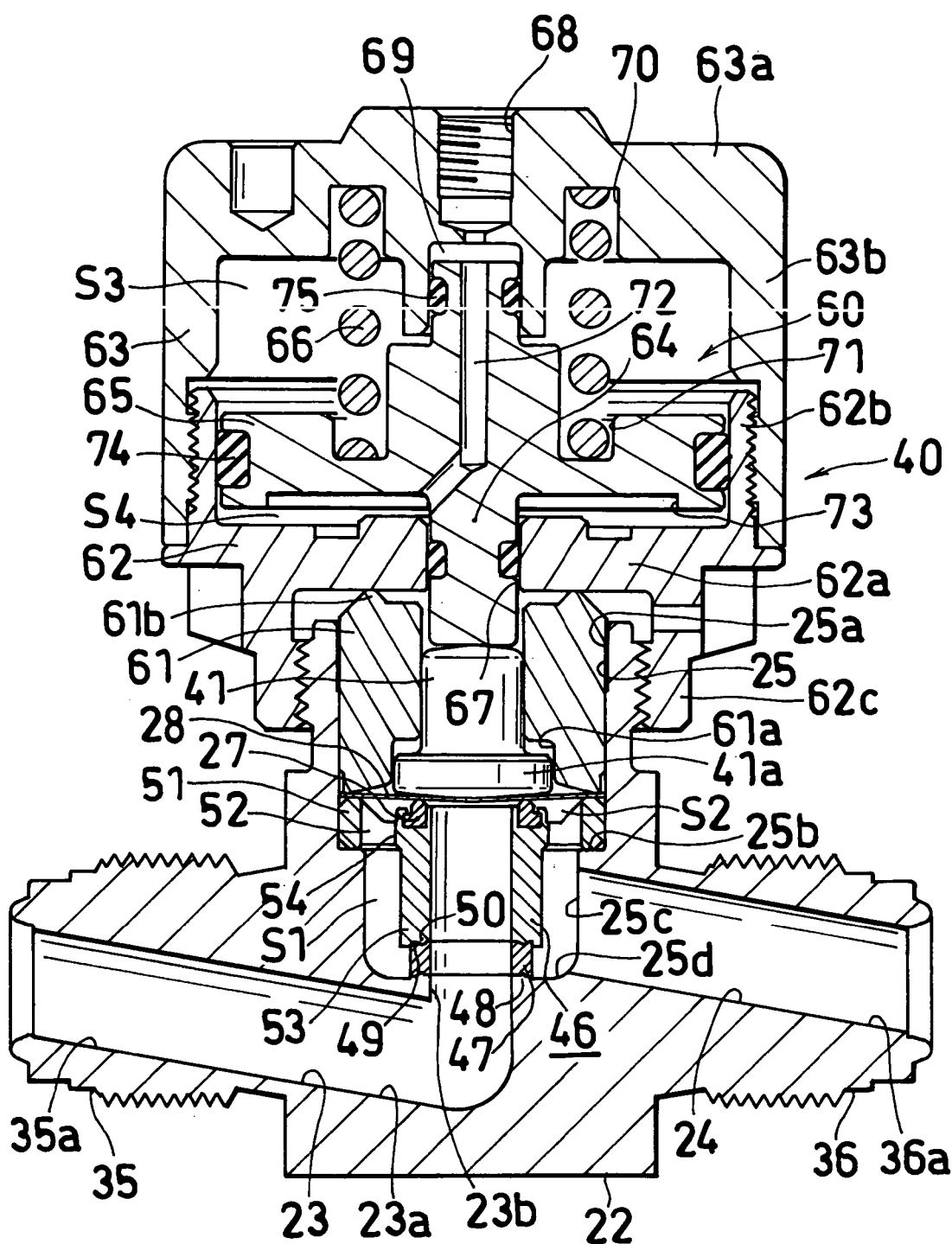
FIG. 3 is a vertical sectional view showing a second embodiment of the fluid controller in accordance with the present invention.

FIG. 3 shows a more preferable aspect of the confronted portion between the lower end portion of the inner disk and the body and the other embodiment of the operation driving portion, as a second embodiment of the fluid controller in accordance with the present invention. In the following description, the same reference numerals are given to the same components as those of FIGS. 1 and 2, and a description thereof will be omitted.

In FIG. 3, a flow path forming disk 46 of a fluid controller 40 in accordance with this embodiment includes a large-diameter cylinder portion 51 fitted to the large-diameter portion 25a of the concave portion in a fluid tight manner, a small-diameter cylinder portion 53 having an outer diameter smaller than an inner diameter of the small-diameter portion 25c of the concave portion and having a lower end received by a bottom surface of the concave portion 25, and a coupling portion 52 coupling a lower end portion of an inner side surface of the large-diameter cylinder portion 51 and an upper end portion of an outer side surface of the small-diameter cylinder portion 53 and received by the step portion 25b of the concave portion. Accordingly, a small-diameter cylinder portion outer annular space S1 is formed between the small-diameter cylinder portion 53 of the flow path forming disk 46 and a peripheral surface of the small-diameter portion 25c of the concave portion.

The valve seat 27 is provided in an upper end surface of the small-diameter cylinder portion 53 of the flow path forming disk 46, and a leading end (an upper end) thereof is set to have an approximately the same height as that of an upper end of the large-diameter cylinder portion 51 of the flow path forming disk 46. The diaphragm 28 is fixed to an upper end portion of the large-diameter cylinder portion 51 of the flow path forming disk 46 in an outer peripheral edge portion thereof, and is structured such as to be brought into contact with a leading end of the valve seat 27 in an annular portion in an inner side in a radial direction from an outer peripheral edge portion in the case of being pressed downward by the diaphragm presser foot 41. Accordingly, there is formed a large-diameter cylinder portion inner annular space S2 surrounded by the inner periphery of the large-diameter cylinder portion 51 of the flow path forming disk 46, the diaphragm 28, the valve seat 27 and the upper surface of the coupling portion 52 of the flow path forming disk 46.

A plurality of through holes 54 in a vertical direction communicating the small-diameter cylinder portion outer annular space S1 and the large-diameter cylinder portion inner annular space S2 are formed in the coupling portion 52 of the flow path forming disk 46 at a uniform interval in a circumferential direction, in the same manner as the through holes 34 in the vertical direction of the coupling portion 32 of the flow path forming disk 26 in accordance with the embodiment shown in FIG. 2.

In accordance with this embodiment, a short cylindrical metal gasket 47 serving as a seal member is interposed between a lower end surface of the flow path forming disk 46 and a bottom surface 25d of the concave portion 25 of the main body 22, and an annular seal projection 48 brought into close contact with a lower surface of the gasket 47 is formed in the bottom surface 25d of the concave portion 25. Further, an annular concave portion 49 to which an upper end portion of the gasket 47 is fitted, and an annular seal projection 50 brought into close contact with an upper surface of the gasket 47 are respectively formed in a lower end surface of the small-diameter cylinder portion 53 of the flow path forming disk 46.

A Teflon coating is applied to the gasket 47, and a Vickers hardness thereof is set to a relatively smaller hardness of 100 to 140 Hv while the Vickers hardness of each of the lower end surface of the flow path forming disk 46 and the bottom surface 25d of the concave portion 25 of the main body 22 is equal to or more than 300 Hv (about 350 Hv). If the flow path forming disk 46 is inserted to the concave portion 25 of the main body 22 by a predetermined pressure, the gasket 47 which is relatively softer is deformed between the flow path forming disk 46 and the main body 22, so that a sealing performance between the lower end surface of the flow path forming disk 46 and the bottom surface 25d of the concave portion 25 of the main body 22 is secured. In this case, an inner diameter of the small-diameter cylinder portion 33 of the flow path forming disk 26, a diameter of the short passage 23b and an inner diameter of the gasket 47 are all equal to each other, so that a smooth flow of the fluid is secured.

An operation driving portion 60 in accordance with this embodiment is of a normally closed type and is structured such as to set an opened state by introducing compressed air. The operation driving portion 60 is provided with a hood 61 fitted to and put on the diaphragm presser foot 41, a lower casing 62 arranged on an upper portion of the main body 22, an upper casing 63 connected to the lower casing 62, a valve rod 64 arranged within a space formed by the upper and lower casings 63 and 62 and having a lower end brought into contact with the diaphragm presser foot 41, a piston 65 integrally arranged in the valve rod 64, and a compression coil spring 66 biasing the piston 65 downward.

The diaphragm presser foot 41 is formed into a columnar shape, and has a flange portion 41a in a lower end.

The hood 61 is formed into a cylindrical shape, and a large-diameter portion 61a having an inner diameter slightly larger than an outer diameter of the flange portion 29a of the diaphragm presser foot 41 is formed in an inner periphery of a lower end portion thereof. The hood 61 is tightly fitted to the concave portion large-diameter portion 25a of the main body 22, and fixes the outer peripheral portion of the diaphragm 28 to the flow path forming disk 46. The diaphragm pressure foot 41 is loosely fitted into the hood 61 from a lower side, and is structured such as to be immovable downward in an illustrated state (a state in which the passage is closed), but be movable upward (a direction of opening the passage).

The lower casing 62 includes a bottom wall 62a, a cylindrical peripheral wall 62b provided in the bottom wall 62a in a rising manner and having a male thread portion formed in an outer peripheral surface, and a small-diameter cylindrical lower protruding portion 62c extending downward from a lower surf ace of the bottom wall 62a and having a female thread portion formed in an inner peripheral surface. The female thread portion of the lower protruding portion 62c is screwed with the male thread portion provided in the outer peripheral surface of the concave portion large-diameter portion 25a of the main body 22, so that the lower casing 62 is fixed to the main body 22. An annular protruding portion 61b functioning as a stopper at a time of fastening the lower casing 62 is provided in the upper surface of the hood 61.

A through hole 67 guiding the valve rod 64 in a vertically movable manner is provided in a center of the bottom wall 62a of the lower casing 62.

The upper casing 63 includes atop wall 63a and a cylindrical peripheral wall 63b. A female thread portion is formed in an inner peripheral surface of a lower portion of the peripheral wall 63b, and the female thread portion is screwed with the male thread portion in the peripheral wall 62b of the lower casing 62, so that the upper casing 63 and the lower casing 62 are integrated so as to form a space in an inner portion. In the top wall 63a of the upper casing 63, there is formed a compressed air introduction pipe connecting female thread portion 68 open upward in a center portion thereof, and a compressed air introducing downward passage 69 connected to a lower end of the female thread portion 68. The top wall 63a of the upper casing 63 is formed such that a center portion structuring the compressed air introducing downward passage 69 protrudes slightly downward in comparison with the other portions, and an annular spring receiving concave portion 70 is formed in a lower surface of the top wall 63a so as to surround the center portion.

A lower end portion of the valve rod 64 is slidably fitted to a central through hole 67 of the lower casing 62, and an upper end portion thereof is slidably fitted into the compressed air introducing downward passage 69 in the top wall 63a of the upper casing 63.

The piston 65 is slidably fitted into the lower casing 62. An annular spring receiving concave portion 71 is provided in an upper surface of the piston 65 so as to face the annular spring receiving concave portion 70 provided in the top wall 63a of the upper casing 63.

Accordingly, an upper space S3 is formed between the upper surface of the piston 65 and the lower surface of the top wall 63a of the upper casing 63, and a lower space S4 is formed between the lower surface of the piston 65 and the upper surface of the bottom wall 62a of the lower casing 62.

A lower end of the compression coil spring 66 is received by the spring receiving annular concave portion 71 in the upper surface of the piston 65, and an upper end thereof is received by the annular concave portion 70 of the upper casing 63.

In the valve rod 64, there is formed a compressed air passage 72 in which an upper end is communicated with the compressed air introducing downward passage 69 in the top wall 63a of the upper casing 63 and a lower end is communicated with the lower space S4. The compressed air passage 72 is open to a concave portion 73 provided in the lower surface of the piston 65, and is communicated with the lower space S4 via the concave portion 73.

An O-ring 74 is interposed between the piston 65 and the lower casing 62, and an O-ring 75 is interposed between the lower end portion of the valve rod 64 and a peripheral surface of the central through hole 67 of the lower casing 62, and between the upper end portion of the valve rod 64 and an inner peripheral surface of the compressed air introducing downward passage 69 of the upper casing 63, thereby preventing the compressed air introduced to the compressed air introducing downward passage 69 from flowing into the upper space S3.

Accordingly, if the compressed air is introduced to the compressed air introduction pipe connecting female thread portion 68 in the top wall 63a of the upper casing 63, the compressed air is introduced to the lower space S4 via the compressed air introducing downward passage 69. Therefore, the piston 65, accordingly, the valve rod 64 is moved to the upper side, and the movement in the opening direction of the diaphragm presser foot 41 and the diaphragm 28 is allowed.

INDUSTRIAL APPLICABILITY

Since the fluid controller in accordance with the present invention is suitable for treating a large flow rate of fluid, and it is not necessary to enlarge the fluid controller in comparison with the conventional one, it is possible to apply the fluid controller to various fluid control devices.

The invention claimed is:

1. A fluid controller comprising: a block-like main body having a fluid inflow passage, a fluid outflow passage and a concave portion open upward; and a diaphragm pressed against or moved apart from an annular valve seat arranged within the concave portion of the main body so as to open and close the fluid passages, wherein
   the concave portion is formed into a shape including a large-diameter portion close to the opening and a small-diameter portion connected to a lower side of the large-diameter portion via a step portion, and the fluid controller is further provided with a flow path forming disk fitted to the concave portion,
   the flow path forming disk includes a large-diameter cylinder portion fitted to the large-diameter portion of the concave portion in a fluid tight manner, a small-diameter cylinder portion having an outer diameter smaller than an inner diameter of the small-diameter portion of the concave portion and having a lower end received by a bottom surface of the concave portion, and a coupling portion coupling a lower end portion of the large-diameter cylinder portion and an upper end portion of the small-diameter cylinder portion and received by the step portion of the concave portion, and
   a peripheral edge portion of the diaphragm is fixed to an upper end portion of the large-diameter cylinder portion of the flow path forming disk, a valve seat is provided in the upper end portion of the small-diameter cylinder portion of the flow path forming disk, an inner annular space of the large-diameter cylinder portion is formed by an inner periphery of the large-diameter cylinder portion of the flow path forming disk, the diaphragm, the valve seat and a top surface of the coupling portion of the flow path forming disk, a plurality of through holes communicating an outer annular space of the small-diameter cylinder portion formed between the small-diameter cylinder portion of the flow path forming disk and a peripheral surface of the small-diameter portion of the concave portion with an inner annular space of the large-diameter cylinder portion are formed in a coupling portion of the flow path forming disk, any one of the fluid inflow passage and the fluid outflow passage is communicated with a lower end of the small-diameter cylinder portion of the flow path forming disk, and the other is formed so as to be communicated with the outer annular space of the small-diameter cylinder portion.

2. The fluid controller of claim 1, wherein the passage communicating with the lower end of the small-diameter cylinder portion of the flow path forming disk includes a short passage extending directly below from the lower end of the small-diameter cylinder portion, and a long passage extending to an outer side from a lower end of the short passage so as to form an acute angle, and the passage communicating with the outer annular space of the small-diameter cylinder portion extends obliquely to a lower outer side from the outer annular space of the small-diameter cylinder portion.

3. The fluid controller of claim 2, wherein a joint portion having an inclined passage communicating with the long passage is provided in one side surface of the main body in a protruding manner, and a joint portion having an inclined passage communicating with the passage communicating with the outer annular space of the small-diameter cylinder portion is provided in the other side surface of the main body in a protruding manner.

4. The fluid controller of any one of claims 1 to 3, wherein a total cross sectional area of a plurality of through holes in the vertical direction formed in the coupling portion of the flow path forming disk is set to 0.5 to 2.0 times of the cross sectional area of the small-diameter cylinder portion of the flow path forming disk.

5. The fluid controller of claim 1, wherein a seal member is interposed between the lower end surface of the flow path forming disk and the bottom surface of the concave portion of the main body.

6. The fluid controller of claim 5, wherein an annular seal projection brought into close contact with each of upper and lower surfaces of the seal member is formed in the lower end surface of the flow path forming disk and the bottom surface of the concave portion of the main body.

* * * * *